United States Patent [19]

Goulding et al.

[11] 4,195,139

[45] Mar. 25, 1980

[54] FIRE RETARDANT COMPOSITION COMPRISING A MELAMINE-ALDEHYDE-PHOSPHATE CONDENSATE

[75] Inventors: Terence Goulding; Michael L. Orton, both of Runcorn, England

[73] Assignee: Imperial Chemical Industries Limited, London, England

[21] Appl. No.: 911,194

[22] Filed: May 30, 1978

[30] Foreign Application Priority Data

Jun. 8, 1977 [GB] United Kingdom ............... 23912/77

[51] Int. Cl.$^2$ ...................... C08L 61/28; C08L 61/32
[52] U.S. Cl. .................................. 525/441; 525/158; 528/244; 528/254; 525/398; 525/509
[58] Field of Search ...................... 528/231, 254, 244; 260/850, 853, 854, 855, 856

[56] References Cited

FOREIGN PATENT DOCUMENTS

922482  1/1955  Fed. Rep. of Germany ........... 528/231
942616  11/1963  United Kingdom ..................... 528/231

*Primary Examiner*—Carman J. Seccuro
*Attorney, Agent, or Firm*—Cushman, Darby & Cushman

[57] ABSTRACT

A melamine-aldehyde-phosphate condensation product which is useful as a fire-retardant, especially for plastics materials, and which is made by reacting melamine and at least one aldehyde, or a condensate of melamine and at least one aldehyde, with at least one oxyacid of phosphorus or precursor therefor or ester thereof until the condensation product is essentially non-acidic, the proportions of melamine and aldehyde being chosen such that the molar ratio of units derived from melamine: units derived from aldehyde in the condensation product is in the range 1:1.5 to 1:4.5, and the proportions of melamine and oxyacid of phosphorus or precursor therefor or ester thereof being chosen such that the molar ratio of units derived from melamine:phosphorus in the condensation product is in the range 1:0.4 to 1:1.7.

17 Claims, No Drawings

FIRE RETARDANT COMPOSITION COMPRISING A MELAMINE-ALDEHYDE-PHOSPHATE CONDENSATE

This invention relates to a fire-retardant composition which is a condensate of melamine, an aldehyde and an oxyacid of phosphorus and to a composition comprising a plastics material and the condensate as a fire-retardant additive.

There have been many previous proposals in the literature for fire-retardant compositions produced by forming a condensate of an amine, an aldehyde and an oxyacid of phosphorus. In many of these prior proposals such compositions, or precursors of such compositions, often in the form of an aqueous solution, have been applied to the surface of a substrate and the compositions, or the precursors thereof, have been heated when on the surface of the substrate in order to cure the composition and, it is believed, to effect reaction between the compositions and the substrate. Such compositions have frequently been applied to cellulosic substrates, for example, wood or cellulosic textile materials.

Thus U.S. Pat. No. 2,582,961 describes treating a cellulosic textile material with an aqueous composition containing, for example, a methylol melamine, a methylol dicyandiamide, and an oxyacid of phosphorus, e.g. orthophosphoric acid, and heating the thus treated textile material to insolubilise the composition. The solution may also be used to treat wood and other materials, both cellulosic and non-cellulosic, which are not in the form of a textile material.

British Pat. No. 1,336,063 describes treatment of a fibrous substrate with a reaction product of a hydroxy alkyl phosphate, for example an addition product of propylene oxide and tetraphosphoric acid, and an aminoplast resin, for example a methylol melamine which may be a di, tri-, or hexa-methylol melamine. The reaction product, when deposited on the fibrous substrate, is cured by heating at a temperature of 70° C. to 200° C. to produce a deposit on the substrate which is insoluble in water.

There have been prior proposals of such fire-retardant compositions in a particulate form, and the use of such compositions in particulate form as additives for plastics materials has been proposed. For example, U.S. Pat. No. 3,479,211 describes a fire-retardant additive which is in the form of an infusible, insoluble resin having a particle size of 50 microns or less and which is formed by reacting a nitrogen compound with orthophosphoric acid. Specifically described is a resin formed from melamine, dicyandiamide, formaldehyde and orthophosphoric acid. Use of the resin in the treatment of textile fabrics is described.

German Pat. No. 922,482 describes a fire-retardant coating composition which is a dispersion of a resin in a film-forming material e.g. an alkyd resin material, the resin which is dispersed being a phosphate of a condensate of formaldehyde with a nitrogen-containing base, e.g. melamine, guanidine or urea. Specifically described is a condensation product of melamine with formaldehyde which is subsequently reacted with orthophosphoric acid to produce a gel which is then ground to a powder.

British Pat. No. 1,058,705 describes an adhesive formed by condensing an "amino-plast-forming component" comprising dicyanidiamide with an aldehyde in the presence of phosphate ions. The "amino-plast-forming component" may include melamine and the melamine may be a polyalkylol melamine, e.g. tetra- to hexa-methylol melamine.

British Pat. No. 942,616 describes a polyurethane foam containing as fire-retardant additive a synergistic combination of an organic halogenated phosphate or phosphonate and a phosphorus-containing polyamide which contains the group

The polyamide may be made by reacting a melamine-formaldehyde condensate with phosphoric acid at a reaction temperature of up to 400° C. or higher to produce a friable water-insoluble compound which is ground to a fine powder.

We have found that the fire-retardant properties of a condensation product of an amine, especially melamine, an aldehyde, and phosphoric acid, especially when used in a composition comprising a plastics material, are critically dependent on the proportions of the various components which are reacted to form the condensation product, and also on the conditions under which the condensation reaction is effected. It is also desirable that the condensation product should have at most only a very low solubility in water so that a composition comprising plastics material and the condensation product is not adversely affected by weather and in particular by rain or by a humid atmosphere. The water solubility of the condensation product has been found to be critically dependent on the proportions of the various components that are reacted and on the conditions under which the condensation reaction is effected. By careful selection of these proportions and conditions it is possible to produce a fire-retardant condensation product which has great utility in a composition comprising a plastics materials, and in particular to produce a product which has a desirable combination of properties, for example, transparency so that the product may be used in translucent plastics materials, durability to water such that the weatherability, and in particular resistance to water, of a plastics material containing the condensation product, is not unduly adversely affected, and good fire-retardant properties.

The present invention provides a melamine-aldehyde-phosphate condensation product which is useful as a fire-retardant, especially for plastics materials, and which is made by reacting melamine and at least one aldehyde, or a condensate of melamine and at least one aldehyde, with at least one oxyacid of phosphorus or precursor therefor or ester thereof until the condensation product is essentially non-acidic, the proportions of melamine and aldehyde being chosen such that the molar ratio of units derived from melamine: units derived from aldehyde in the condensation product is in the range 1:1.5 to 1:4.5, and the proportions of melamine and oxyacid of phosphorus or precursor therefor or ester thereof being chosen such that the molar ratio of units derived from melamine: phosphorus in the condensation product is in the range 1:0.4 to 1:1.7.

The product desirably has a substantial resistance to degradation by weathering and for this reason it is preferred that when a sample of the product having a particle size in the range 10 microns to 150 microns is extracted with boiling water, e.g. in a Soxhlet apparatus, 50% of the phosphorus originally present in the sample is extracted in a time which is at least 2 hours, preferably at least 5 hours, and most preferably at least 10 hours. The greater is this extraction time the greater is the resistance of the product to degradation by weathering.

The product may be produced in the form of a coating on the surface of a substrate to which it is desired to impart fire-retardant properties, for example, by applying a solution, e.g. an aqueous solution, of the components from which the product is produced to the surface of the substrate and effecting the reaction on the surface of the substrate.

Alternatively, the product may be produced in a particulate form by producing the product in a suitable reaction vessel and subsequently breaking up and grinding the product to the desired particle size. Where the condensation product is to be used as a fire-retardant additive for plastics materials it suitably has a particle size not greater than 300 microns, and preferably has a particle size in the range 150 microns to 250 microns. Lower particle size products may however be used.

The condensation product may be produced by reacting a composition comprising melamine, at least one aldehyde and at least one oxyacid of phosphorus or precursors therefor or ester therefor, or alternatively it may be produced by reacting a condensate of melamine and at least one aldehyde, for example an alkylol melamine, e.g. methoylol melamine, or an ether of an alkylol melamine, with at least one oxyacid of phosphorus, precursor therefor or ester thereof. Within the scope of the term melamine we include derivatives of melamine which are capable of reacting with an aldehyde. The reaction may suitably be carried out in solution, especially in an aqueous solution, the diluent being removed during the reaction.

Suitable aldehydes for use in producing the condensation product include, for example, acetaldehyde and chloral, but preferably the aldehyde which is used is formaldehyde. It is particularly convenient to use in the reaction formaldehyde in the form of an aqueous solution, e.g. a 37% solution in water. In this case the water in the formaldehyde solution may provide the diluent for use in the reaction.

A preferred oxyacid of phosphorus is orthophosphoric acid, or a precursor therefor, that is phosphorus pentoxide. Other oxyacids of phosphorus which may be used include pyrophosphoric acid, polyphosphoric acids, e.g. tri- and tetraphosphoric acids, and phosphorous acid. Esters of oxyacids of phosphorus may also be used, for example, esters of orthophosphoric acid.

The proportions of melamine:aldehyde and of melamine:oxyacid of phosphorus or precursor therefor or ester thereof used in production of the condensation product, and the temperatures used, are critical if the product is to have a desirable combination of properties. Thus, if proportions are used which in the condensation product result in ratios of units derived from melamine: units derived from aldehyde and ratios of units derived from melamine: phosphorus outside the aforementioned ranges then the product, for example, when in the form of a coating on the surface of a substrate, may not be sufficiently durable in water such that the coating may be washed off the surface at an undesirably high rate, and also it may not impart to the substrate the desired fire-retardant properties. Alternatively, when the product is in a particulate form dispersed in a plastics material the durability to water may not be sufficient such that the plastics material may become opaque on prolonged exposure to water and also the degree of fire-retardancy imparted to the plastics material may not be as great as may be desired.

Thus, we find that where the product is produced at a temperature below 80° C. it is difficult to remove the acidity from the product with the result that solubility of the product in water may be greater than is desired. Alternatively, where a temperature of greater than 210° C. is used we find that although the product may be no longer acidic and the solubility of the product in water may be very low the level of fire-retardancy imparted by the product may not be as great as may be desired as the product may have a tendency to char during production and thus may lose some of its fire-retardant properties. In order to produce a product which is essentially non-acidic and which has a desirable combination of water-insolubility and fire-retardancy a reaction temperature in the range 80° C. to 210° C. should be used, and preferably a temperature in the range 140° C. to 180° C.

In general the greater is the reaction temperature and the longer is the reaction time the greater is the durability of the product to water and the lower is the level of the acidity in the product. The reaction should be effected at a temperature which is high enough and for a time which is sufficiently long at the particular temperature to produce a product which is essentially no longer acidic. In general the lower the reaction temperature the longer will be the reaction time required. By "essentially non-acidic" we mean that the product should have a pH of greater than 6. The pH of the product may be tested by contacting the product in particulate form with moist litmus paper. If a product is produced which is too acidic, that is a product having a pH of less than 6, the product may tend to have an undesirably low durability to water. Reaction times will generally be greater than 15 minutes and may be as long as 10 hours depending on the temperature of reaction.

Where the proportion of melamine:aldehyde which is used results in a product having a molar ratio of units derived from melamine:units derived from aldehyde below the lower limit of 1:1.5 hereinbefore described the product tends to be opaque and thus undesirable for use as a coating or as an additive in translucent plastics materials, whereas when the ratio is above the upper limit of 1:4.5 hereinbefore described the product tends to have a durability to water that is lower than is desirable. A molar ratio of units derived from melamine:units derived from aldehyde in the condensation product in the range 1:2 to 1:3 is preferred, and a ratio of substantially 1:2 is most preferred, that is it is most preferred to use a dialkylol melamine e.g. dimethylol melamine.

The molar ratio of units derived from melamine:phosphorus in the condensation product is also critical if a product having a desirable combination of properties is to be produced. Thus, if the ratio is below the lower limit of 1:0.4 hereinbefore described we find that the product may be opaque and may not have a desirable level of fire-retardant properties. Although the durability of the product to water may be good an opaque product is undesirable for use with a translucent plastics material. Alternatively, where the ratio is above the upper limit of 1:1.7 hereinbefore described it is difficult to make the product essentially non-acidic and the product tends to have a durability to water that is lower than is desirable with the result that its weatherability is poor although its fire-retardant properties may be good. A preferred molar ratio is in the range 1:0.6 to 1:1.2 for a good combination of properties.

The condensation product of the invention may be deposited in the form of a coating on the surface of a substrate thus protecting the substrate in a fire situation. The product is believed to act by forming an intumescent layer when it heated, the intumescent layer giving a measure of protection to the substrate in a fire. Substrates which may thus be protected include textile materials, especially cellulosic textile materials, other cellulosic materials, e.g. wood, and articles of plastics materials, particularly sheets of plastics materials.

The condensation product of the invention when in particulate form may be dispersed in a plastics material as a fire-retardant additive. In this case the product forms an intumescent mass when heated in a fire situation thus protecting the plastics material. Suitable plastics materials include polyolefins, for example, polyethylene and polypropylene; polyvinyl halides, for example, poly(vinyl chloride) and poly(vinylidene chloride) and copolymers of vinyl halides; polystyrene; polyurethanes; and polyester resins formed by reaction of an ethylenically-unsaturated polyester with an ethylenically-unsaturated monomer.

The particulate condensation product may be incorporated into the plastics material by methods which are well known in the art for incorporating particulate materials into plastics materials.

The condensation product of the invention is generally transparent, or at least translucent and thus it is particularly suitable for use with transparent or translucent plastics materials as it does not unduly adversely affect the light transmission of such plastics materials when such materials are, for example, in the form of a sheet.

The condensation product of the invention may suitably be incorporated in or on the plastics material in an amount of at least 5% by weight of the plastics material, and preferably in an amount of 10% to 70% by weight of the plastics material.

The plastics material may also incorporate other conventional additives for such materials, for example stabilisers, pigments, and reinforcing materials, e.g. glass fibre reinforcement.

The invention is illustrated by the following Examples in which all parts are expressed as parts by weight.

EXAMPLE 1

105 parts of dimethylol melamine were mixed with 29.2 parts of water and the mixture was heated to boiling until the dimethylol melamine dissolved. The solution was then cooled to room temperature and 52.5 parts of an 88% by weight solution of orthophosphoric acid in water were added with stirring. After stirring for 5 minutes the resultant solution was poured into a tray and allowed to stand for 2 hours until it had set solid. The solid was then heated in an oven at a temperature of 150° C. for 2 hours, the solid was removed from the oven, broken up, and ground on a ball mill and a particulate batch was selected having a particle size in the range 150 microns to 250 microns. The selected particulate material was then further heated at a temperature of 175° C. for 2 hours after which time the surfaces of the particles were non-acidic when tested with moist litmus paper.

The fire-retardant properties of the particulate material when incorporated into a plastics material were tested as follows.

A composition comprising 15 parts of polyester resin mixture, 0.3 part of catalyst (acetyl acetone peroxide) and 0.3 part of accelerator (0.4% by weight solution of cobalt naphthenate in white spirit) was brushed onto a 1 square foot sample of poly(ethylene terephthalate) film to give an even coating and 34 parts of the particulate fire-retardant material prepared as described above were sprinkled evenly over the resin mixture and pressed into the mixture by placing a poly(ethylene terephthalate) film over the mixture and passing a roller over the thus formed sandwich containing the resin mixture. The top film was then removed and a composition comprising 108 parts of polyester resin mixture, 2.25 parts of accelerator and 1.8 parts of catalyst as used above was evenly spread with a palette knife on the mixture of resin and particulate fire-retardant material. A 1 foot square glass fibre mat (2 inch chopped strand E-glass) weighing 450 g m$^{-2}$ was then pressed into the resin using a metal roller, a composition comprising 12 parts of polyester resin mixture, 0.25 part of accelerator and 0.2 part of catalyst was spread evenly over the glass fibre mat, and finally a film of polyethylene terephthalate) was placed on the resin and the thus formed sandwich was pressed with a soft roller in order to expel air bubbles. The sandwich was then allowed to stand at room temperature for 16 hours and was then heated in an oven at 85° C. for 3 hours. The cured sheet was then removed from the oven and the poly(ethylene terephthalate) films were removed from the sheet.

The fire-retardant effect provided by the particulate material was then assessed by testing the sheet in a 2 foot flame tunnel. The sheet had a flame-spread rating of 53 (average of 31 tests).

In the particulate fire-retardant material the molar ratio of melamine:phosphorus was 1:0.83 and the molar ratio of melamine:formaldehyde was 1:2, and the particulate fire-retardant material was present in the sheet in a proportion of 25 parts per 100 parts of resin (25 phr).

The resin mixture from which the sheet was prepared had an acid value of 31 mg KOH g$^{-1}$ and comprised 62% by weight of a polyester resin made by condensing propylene glycol with a 1:1 molar mixture of maleic anhydride and phthalic anhydride, 24% by weight of styrene, and 14% by weight of methyl methacrylate.

The flame-spread rating of the sheet was measured in a 2 foot tunnel constructed and operated in accordance with the instructions contained in the Journal of Paint Technology, Volume 39, No. 511, August 1967, pages 494 to 500.

By way of comparison the above procedure was repeated except that particulate fire-retardant material was omitted. The flame-spread rating of the sheet was substantially greater than 100 and was so high that it could not be measured accurately.

By way of further comparison the above procedure was repeated except that in the production of the particulate fire-retardant material 21 parts of 88% by weight solution of orthophosphoric acid in water was used and the molar ratio of melamine:phosphorus in the particulate fire-retardant material was 1:0.34. The flame-spread rating of the sheet was 100.

EXAMPLE 2

The procedure of Example 1 was followed except that 105 parts of dimethylol melamine and 89 parts of 88% by weight solution of orthophosphoric acid were used. (Melamine:phosphorus molar ratio 1:1.4, melamine:formaldehyde molar ratio 1:2).

The flame-spread rating of the resultant sheet was 52.

EXAMPLE 3 to 5

The procedure of Example 1 was followed in three separate Examples except that the polyester resin used in the Examples was a mixture having an acid value of 23 mg KOH $g^{-1}$ comprising 65% by weight of a polyester made by condensing propylene glycol with a 1:1 molar mixture of maleic anhydride and phthalic anhydride, and 35% by weight of styrene.

The proportions of dimethylol melamine and orthophosphoric acid were chosen such that the molar ratios of melamine:phosphorus and of melamine:formaldehyde in the particulate fire-retardant material were as given in Table 1. The temperatures of heating used in the preparation of the material are also given in Table 1.

TABLE 1

| Example | Molar Ratio M:P | Molar Ratio M:F | Temperature of Heating °C. |
|---|---|---|---|
| 3 | 1:0.8 | 1:2 | 150 |
| 4 | 1:0.8 | 1:2 | 200 |
| 5 | 1:1.7 | 1.2 | 150 |

The fire-retardant effect produced was as shown in Table 2.

TABLE 2

| Example | Flame-Spread Rating |
|---|---|
| 3 | 67 |
| 4 | 72 |
| 5 | 26 |

EXAMPLES 6 TO 8

In order to show the effect of variation in the composition of the plastics material the procedure of Example 1 was followed to produce in three separate Examples sheets comprising particulate fire-retardant material in a polyester resin except that the polyester resin mixture used in Example 1 was replaced as follows:

Example 6—A polyester resin mixture having an acid value of 23 mg KOH $g^{-1}$ comprising 65% by weight of a polyester made by condensing propylene glycol with a 1:1 molar mixture of maleic and phthalic anhydride, and 35% by weight of styrene.

Example 7—A polyester resin mixture having an acid value of 24 mg KOH $g^{-1}$ comprising 63% by weight of a condensate of hexachloroendomethylene tetrahydrophthalic anhydride and ethylene glycol, 27% by weight of styrene, and 10% by weight of trichloroethyl phosphate.

Example 8—A polyester resin as used in Example 6 plus a facing gel-coat layer on the sheet of a polyester resin as used in Example 7.

The fire-retardant effects produced were as shown in Table 3.

TABLE 3

| Example | Flame-Spread Rating |
|---|---|
| 6 | 68 |
| 7 | 31 |
| 8 | 40 |

EXAMPLE 9

In order to show the effect of a humid atmosphere on the particulate fire-retardant material and on the light transmission of a plastics sheet containing the fire-retardant material eight sheets of polyester resin containing particulate fire-retardant material were prepared following the procedure of Example 1. Four of the sheets were placed in a tropical humidity cabinet at a temperature of 38° C. and a relative humidity of 95% for respectively 12, 20, 35 and 60 days and thereafter the flame-spread rating and the light transmission of the sheets was measured. For comparison four control sheets were exposed to "normal" conditions (25° C. and 40% relative humidity) for 12, 20, 35 and 60 days respectively and the flame-spread ratings and light transmissions of the sheets were measured. The results are shown in Table 4.

TABLE 4

| Exposure Days | Normal Conditions | | Tropical Humidity Conditions | |
|---|---|---|---|---|
| | Flame-Spread Rating | Light Transmission % | Flame-Spread Rating | Light Transmission % |
| 12 | 69 | 75 | 51 | 63 |
| 20 | 56 | 82 | 64 | 74 |
| 35 | 52 | | 50 | |
| 60 | 47 | 79 | 50 | 75 |

EXAMPLES 10 to 16

In seven separate Examples particulate fire-retardant materials were prepared following the procedure described in Example 1 except that the molar ratios of melamine:phosphorus, and the temperatures of heating and the total times of heating were as shown in Table 5, and a particle size in the range 10 to 15 microns was selected. (In each Example the melamine used was in the form of dimethylol melamine.)

TABLE 5

| Example | Molar Ratio Melamine:Phosphorus | Temperature °C. | Time Hours |
|---|---|---|---|
| 10 | 1:0.5 | 85 | 16 |
| 11 | 1:0.7 | 85 | 16 |
| 12 | 1:0.8 | 85 | 16 |
| 13 | 1:0.8 | 150 | 3 |
| 14 | 1:0.8 | 200 | 3 |
| 15 | 1:1.2 | 200 | 3 |
| 16 | 1:1.7 | 200 | 3 |

Each of the particulate fire-retardant materials was extracted in boiling water, the resulting solution was periodically analysed for phosphorus, and the time taken for the half of the phosphorus initially present in the material to become dissolved in the water was determined. The results are presented in Table 6.

TABLE 6

| Example | Time to Extract 50% of Phosphorus Hours |
|---------|----------------------------------------|
| 10 | 16 |
| 11 | 7.5 |
| 12 | 5.5 |
| 13 | 6 |
| 14 | 13.5 |
| 15 | 2.5 |
| 16 | 2 |

EXAMPLE 17

A particulate fire-retardant material was prepared following the procedure of Example 1 except that the dimethylol melamine was replaced by 122 parts of trimethylol melamine and the total time of heating to produce the material was 16 hours and the temperature was 80° C. (Mole ratio of Melamine:formaldehyde 1.3 and of melamine:phosphorus 1:0.83).

The test procedure of Examples 10 to 16 was then followed and it was found that half of the phosphorus initially present in the particulate material was extracted by boiling water in 4.5 hours.

By way of comparison the above procedure was repeated except that the trimethylol melamine was replaced by 173 parts of hexamethylol melamine (Molar ratio of melamine:formaldehyde 1:6 and of melamine:-phosphorus 1:0.83).

The time required to extract into boiling water half of the phosphorus initially present in the particulate material was 1 hour.

What we claim is:

1. A melamine-aldehyde-phosphate condensation product produced by reacting melamine and at least one aldehyde, or by reacting condensate of melamine and at least one aldehyde, with at least one oxyacid of phosphorus or precursor therefor or ester thereof until the condensation product is essentially non-acidic, the proportions of melamine and aldehyde being chosen such that the molar ratio of units derived from melamine:units derived from aldehyde in the condensation product is in the range 1:1.5 to 1:4.5, and the proportions of melamine and oxyacid of phosphorus or precursor therefor or ester thereof being chosen such that the molar ratio of units derived from melamine:phosphorus in the condensation product is in the range 1:0.4 to 1:1.7.

2. A condensation product as claimed in claim 1 which is in particulate form.

3. A condensation product as claimed in claim 2 in which the particle size is not greater than 300 microns.

4. A condensation product as claimed in claim 3 in which the particle size is in the range 150 to 250 microns.

5. A condensation product as claimed in claim 1 which, when in a particulate form having a particle size in the range 10 microns to 150 microns and when extracted in boiling water, loses 50% of the phosphorus originally present in the product in a time which is at least 2 hours.

6. A condensation product as claimed in claim 1 in which the aldehyde is formaldehyde.

7. A condensation product as claimed in claim 1 in which the oxyacid of phosphorus is orthophosphoric acid.

8. A condensation product as claimed in claim 1 in which the molar ratio of units derived from melamine:units derived from aldehyde is in the range 1.2 to 1:3.

9. A condensation product as claimed in claim 1 in which the molar ratio of units derived from melamine:-phosphorus is in the range 1:0.6 to 1:1.2.

10. A process for producing a condensation product as claimed in claim 1 which process comprises reacting at a temperature in the range 80° C. to 210° C. a composition comprising melamine and at least one aldehyde, or a condensate of melamine and at least one aldehyde, and at least one oxyacid of phosphorus or precursor therefor or ester thereof.

11. A process as claimed in claim 10 in which the reaction is carried out in aqueous solution.

12. A process as claimed in claim 11 in which reaction is effected at a temperature in the range 140° C. to 180° C.

13. A composition comprising a plastics material and, as a fire-retardant, a condensation product as claimed in claim 1.

14. A composition as claimed in claim 13 which comprises a coating of the condensation product on the surface of the plastics material.

15. A composition as claimed in claim 13 which comprises the condensation product in particulate form dispersed in the plastics material.

16. A composition as claimed in claim 13 in which the plastics material is a polyester resin.

17. A composition as claimed in claim 13 in which the plastics material is present in an amount of at least 5% by weight of the plastics material.

* * * * *